Oct. 20, 1931.  S. J. DUNKLEY  1,827,841
HYDROMETER
Filed Aug. 8, 1921
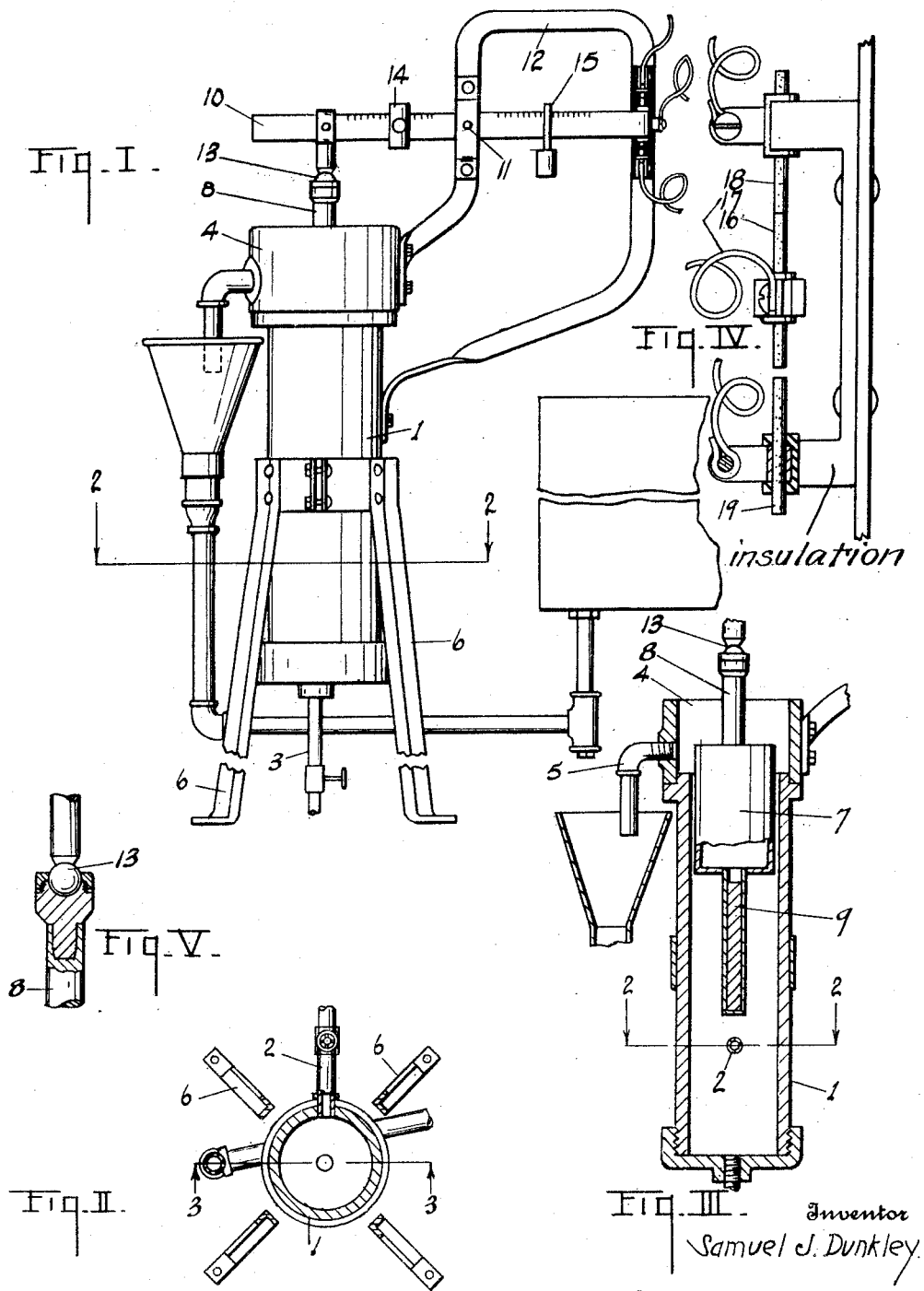
Inventor
Samuel J. Dunkley
By Chappell & Earl
Attorneys

Patented Oct. 20, 1931

1,827,841

UNITED STATES PATENT OFFICE

SAMUEL J. DUNKLEY, OF OAKLAND, CALIFORNIA, ASSIGNOR, BY MESNE ASSIGNMENTS, TO SPRAGUE SELLS CORPORATION, OF CHICAGO, ILLINOIS, A CORPORATION OF DELAWARE

HYDROMETER

Application filed August 8, 1921. Serial No. 490,755.

This invention relates to an improved regulating device for regulating and controlling the supply and density of lye-solutions used in peeling fruits and vegetables.

In the handling and preparation of fruits, particularly for canning purposes, it is necessary in some instances to first remove the peeling or outer skin from the individual fruits. One of the methods of removing such skins contemplates subjecting the fruits to the action of a lye solution, either by immersion or as a spray.

Different fruits require somewhat different procedure in the treatment attending the skin removal, but in all where part of the treatment includes subjecting the fruits to the action of a lye solution, by spray or otherwise, a certain predetermined strength of lye solution is necessary to effect the results desired.

Some mechanical or electrical means are necessary to maintain the proper density of solution since a more or less constant supply of lye producing material and water is required to keep the density to the necessary uniformity during the period of operation.

The subject of this application is a unitary part of such necessary equipment and comprises broadly a regulating device having a movable float member directly connected by suitable devices to electrical means for operating the various pumps and motors in the equipment for supplying the necessary lye material and water to maintain the desired density of solution. The float member is enclosed in a suitable chamber and its movement therein is controlled entirely by the density of the solution in which it is immersed.

The circulation of the solution through the control device of this application as well as through the other apparatus comprising the lye circulating equipment is shown, described and claimed in my Patent 1,429,129, companion to this application and filed coincident therewith. The further description of this apparatus seems not necessary in this application since it is desired to cover only the unitary control and its immediate associated parts herein. A principal object of the present invention resides in providing a lye testing chamber having an inlet drain and overflow with means for circulating a lye solution through said chamber to actuate a float member and through the changing position of said float member to make and break electrical circuits for controlling the operation of such motors and pumps as are necessary for circulating the liquid throughout the system.

A further object of the invention resides in associating with said float member adjustable devices that will permit of regulating the density of solution through changing the buoyancy of the float member.

A further object of the invention resides in associating a multiplicity of electrical contact devices with said float mechanism and operable therefrom for the control of solution flow during the operation of the system.

With such objects in view as well as other advantages which may be inherent in the invention, consisting in the parts and combinations hereinafter set forth and claimed, it is understood that the several necessary elements, parts and combinations constituting the same may be varied in their proportions, placement and general arrangement without departing from the scope and nature of the invention. In order to make the invention more clearly understood there are shown, somewhat diagrammatically, in the accompanying drawings means and mechanism for placing the same in concrete form, without limiting the improvements in their applications to the particular construction chosen to illustrate the invention.

Fig. I is a detail elevation view of my improved hydrometer.

Fig. II is a horizontal sectional view taken on line 2—2 of Figs. I and III.

Fig. III is a vertical sectional view taken on line 3—3 of Fig. II.

Fig. IV is a detail view of the switch contact means.

Fig. V is a detail sectional view taken through the ball and socket coupling of the hydrometer float.

In the drawings similar numerals of reference refer to similar parts throughout the several views, and the sectional views are taken looking in the direction of the little arrows at the ends of the section lines.

Considering the numbered parts of the drawings, 1 is the hydrometer tank which is supplied through pipe 2 and has a drain pipe 3 at the bottom. The tank has an enlarged portion 4 at the top with an overflow pipe 5. The whole is supported on a suitable stand 6.

Within the tank is disposed the float 7 which is preferably about six inches in diameter and nine inches high, cylindrical in form and loosely disposed within the tank. It is provided with an upwardly projecting stem 8 and a downwardly projecting hollow stem 9. The stem 9 is filled with suitable weight, as with lead, to maintain the float in upright position. The upper end of the large part of the float is approximately an inch above the level of the liquid.

A lever 10 is fulcrumed at 11 on a suitable supporting frame 12 carried by the tank 1. The stem 8 of the float is connected by ball and socket joint 13 to the said lever. The lever is graduated and is provided with a counterbalance weight 14 and an adjustable yielding weight 15 which can be adjusted according to the scale to secure and regulate the movement of the lever under the action of the hydrometer float. The end of the lever is provided with a contact carbon 16 connected to a current supply 17, and in suitable insulation upon the support are terminals 18 and 19 to suitable electric means such as electric motor pumps or valves to control supply, not here shown.

A portion of the fluid to be controlled and regulated is passed through the hydrometer, and by its action on the float causes the contacts and through the connections and the electric means regulates the main supply of material being controlled. Devices are thrown into operation for regulating the supply of lye or other solution that goes to the mass being regulated. When this is strengthened the quantity by-passed acts upon the hydrometer to cut off the supply, and on the other hand when the by-passed part shows a weakening the action is reversed and more is supplied. For example, when lye is added the specific gravity is raised and when water is added the specific gravity is lowered.

The operation of my improved lye solution density controlling device would be somewhat as follows:

During the operation of the equipment including the subject of this application for the circulation of lye solution throughout the system there is substantially a constant flow of liquid through the regulator. The density of this flowing liquid varies according to the demands made upon it in its course through the system and its application to the fruit being treated. It loses density each time it makes a circuit due to the absorption by the fruit and débris carried thereby and further due to the constant supply of fresh water to maintain the bulk of liquid necessary to have in the system at all times. As the density becomes less the float will gradually sink in the solution flowing through the float chamber. This movement of the float member will automatically close the contacts 16 and 18 and thereby bring into action mechanism that will cause the lowering density liquid to flow through a source of lye material, thereby absorbing said material and increasing the density as the absorption takes place. When the density reaches such a degree that the float member is caused to rise in the float chamber the contacts 16 and 18 are broken and the flow of liquid through the lye material source is discontinued. The contacts 16 and 19 are then closed by the upward movement of the float member which actuates mechanism that prevent the solution from flowing through the lye material source so that the density is not further increased until such time as it is again weakened to the point where the density needs replenishment.

The control device is preliminarily adjusted to zero or a neutral position by means of the movable weight 14 on the arm 10 and the density of the solution is controlled by means of the movable weight 15 on the arm 10, the fulcrum of the arm 10 being between the two weights.

Having thus described my invention what I claim as new and desire to secure by Letters Patent is:

1. An apparatus for controlling the density of a flowing solution consisting of a solution tank, a mechanism wherein the balance may be varied according to the change desired in the density of the solution, said mechanism comprising a lever pivoted near its center, two movable weights on said lever, one on each side of the center, a float connected to one end of the lever and resting on the solution in the said tank, electrical contacts carried by the other end of the lever coacting with fixed contacts mounted adjacent thereto, the change of density of said solution resulting from a shifting of the movable weights on said lever to place more or less weight on said float and thereby require a greater or less density of solution to move the balanced lever to make and break the electrical contacts carried thereby.

2. An apparatus for controlling the density of a flowing solution comprising a solution tank, a control mechanism including a float, a lever and means for pivoting said lever near its center, two movable members on said lever adapted to vary its balance relative to its pivot, means permitting a flow of solution through said tank, a float in said tank connected to one end of said lever, fixed and movable contacts adjacent the other end of said lever, the making and breaking thereof being controlled by said lever, the flow of solution through said tank effecting said lever according to the relative positions of said movable members to thereby control the density of said solution.

In witness whereof, I have hereunto set my hand.

SAMUEL J. DUNKLEY.